United States Patent
Park et al.

(10) Patent No.: US 6,989,521 B2
(45) Date of Patent: Jan. 24, 2006

(54) SEMI-TRANSMISSION TYPE LIQUID CRYSTAL DISPLAY DEVICE

(75) Inventors: Young Il Park, Kyoungki-do (KR); Dong Hae Suh, Daegu (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 305 days.

(21) Appl. No.: 10/673,013

(22) Filed: Sep. 26, 2003

(65) Prior Publication Data

US 2004/0201801 A1    Oct. 14, 2004

(30) Foreign Application Priority Data

Apr. 14, 2003 (KR) .................... 10-2003-0023500

(51) Int. Cl.
*H01L 27/00* (2006.01)
(52) U.S. Cl. .............. 250/208.1; 250/225; 250/239
(58) Field of Classification Search .............. None
See application file for complete search history.

(56) References Cited

U.S. PATENT DOCUMENTS 6,295,109 B1 *  9/2001  Kubo et al. ............... 349/119

* cited by examiner

*Primary Examiner*—Que T. Le
(74) *Attorney, Agent, or Firm*—Ladas & Parry LLP

(57) ABSTRACT

A semi-transmission type liquid crystal display device has a liquid crystal layer between lower and upper substrates, each having a reflection electrode and a lower orientation film. The upper substrate has a color filter and an upper orientation film. Upper and lower phase films are positioned on the upper and lower substrates, respectively, to transform polarized light from linear to circular. Upper and lower polarization plates are provided on the upper and lower phase films, respectively. The liquid crystal layer phase delay $d\Delta$ n is 0.24–0.27 $\mu$m. The upper phase film has a function of $\lambda/4$ phase compensation and an optical axis of 140° to 146°. The upper orientation film has an orientation angle of 40°–50°, and the lower orientation film has an orientation angle of −10° to −20° relative to a horizontal line. The upper polarization plate has a transmission axis angle of 104°–122.5°.

11 Claims, 4 Drawing Sheets

SEMI-TRANSMISSION TYPE LIQUID CRYSTAL DISPLAY DEVICE

BACKGROUND OF THE INVENTION

1. Field of the Invention

The present invention relates to a liquid crystal display device, and more particularly to a semi-transmission type liquid crystal display device capable of ensuring a large viewing-angle, improved productivity, suppressed power consumption and increased yield by optimizing the design of its optical elements.

2. Description of the Prior Art

Liquid crystal display devices are generally classified into transmission-type devices and reflection-type devices. The transmission-type devices utilize the light irradiated from their backlights for display. They are widely used as the display devices of, e.g., word processors, laptop personal computers. However, they cannot provide proper display if they are used in an environment (e.g., outdoor) having a large intensity of incident light on them.

The reflection-type devices reflect external light and use it for display. They consume less power than the transmission-type devices because they do not carry backlights. Accordingly, they are drawing attentions as display devices of portable appliances, which are becoming popular rapidly.

Such a reflection-type liquid crystal display device comprises a lower substrate, a reflection electrode, a lower orientation film, a liquid crystal layer, an upper orientation film, an upper transparent electrode, a color filter, an upper substrate, an optical compensation film, and a polarization plate. The upper and lower substrates are spaced a determined distance and a liquid crystal is injected between them. The phase of the liquid crystal used in the reflection-type liquid crystal display element includes a nematic phase and a cholestric phase. When the nematic phase is used, the liquid crystal has a molecular array wherein all of the liquid crystal molecules are arranged substantially homogeneous or homeotropic relative to the surfaces of the upper and lower substrates. The array has a twisted azimuth wherein the molecules are twisted a determined angle continuously.

The display implementation of the reflection-type liquid crystal display device according to its optical characteristics will now be explained.

When there is no voltage applied, linearly polarized light from the polarization plate is changed into circularly polarized light, e.g., leftward circularly polarized light, after passing through a phase film. The light is again changed into linearly polarized light, after passing through the liquid crystal layer, and then reflected by a reflection plate. As the reflected light passes through the liquid crystal layer again, it is changed into leftward circularly polarized light. After passing through the phase film, the light is transformed into light whose polarization direction is parallel to the polarization axis of the polarization plate. If the transformed light passes through the polarization plate, a white state is implemented.

When a voltage is applied, the leftward circularly polarized light from the polarization plate and the phase film passes through the liquid crystal layer without any change. Then, the light is reflected by the reflection plate and is changed into rightward circularly polarized light. As the light passes through the liquid crystal layer and the phase film again, it is transformed into linearly polarized light whose polarization direction is perpendicular to the polarization axis of the polarization plate. The transformed light cannot pass through the polarization plate and, consequently, a dark state is implemented.

In the case of the reflection-type liquid crystal display device, good display screen depends on how the characteristic values of each of the components are optimized. More specifically, in order to effectively improve the reflectivity of the reflection-type liquid crystal display device, the transmission axis angle of the polarization plate, the optical characteristics of the phase film, the width d of the liquid crystal layer, the phase delay value d$\Delta$n of the liquid crystal layer, the twist angle of the liquid crystal, the orientation angle of the orientation film, and the characteristics of the reflection plate should be optimized.

FIG. 1 is a sectional view illustrating a reflection-type liquid crystal display device according to the prior art.

The reflection-type device, as shown in FIG. 1, has a structure comprising a lower substrate 10 with a reflection plate 11 and a lower orientation film 12, an upper substrate 13 with a color filter 14 and an upper orientation film 15, a liquid crystal layer 16 interposed between the lower and upper substrates 10, 13, as well as a $\lambda/4$ film 17 and a polarization plate 18 positioned on the outer surface of the upper substrate 13 in series. The $\lambda/4$ film 17 is a mono-axial film for the optical compensation of light having a phase differential of $\lambda/4$.

The reflection-type liquid crystal display device according to the prior art, having a structure as mentioned above, has a twist angle of 90° and the angle between the optical axis of the $\lambda/4$ film 17 and the axis of the polarization plate 18 is 45°.

However, the reflection-type liquid crystal display device according to the prior art has a problem of poor display characteristics, because its reflectivity is decreased if two $\lambda/4$ films are used to optimize its cell design and it cannot properly perform the function of providing a phase differential of $\lambda/4$ in the broad band of visible ray wavelength if one $\lambda/4$ film is used to avoid the reflectivity decrease.

Furthermore, the reflection-type device according to the prior art has very small cell gap and therefore has poor yield when applied to actual process.

SUMMARY OF THE INVENTION

Accordingly, the present invention has been made to solve the above-mentioned problems occurring in the reflection-type liquid crystal display device according to the prior art, and an object of the present invention is to provide a semi-transmission type liquid crystal display device capable of performing the role of a transmission-type liquid crystal display element while maintaining the function of a reflection-type liquid crystal display element by designing a reflection-type liquid crystal display area and a transmission-type liquid crystal display area separately.

In order to accomplish this object, there is provided a semi-transmission type liquid crystal display device comprising:

a lower substrate having a reflection electrode and a lower orientation film;

an upper substrate having a color filter and an upper orientation film;

a liquid crystal layer interposed between the upper and lower substrates;

upper and lower phase films positioned on the outer surfaces of the upper and lower substrates, respectively, for transforming linearly polarized light into circularly polarized light; and upper and lower polarization plates for transforming natural light incident on each of the upper and lower phase films into linearly polarized light, respectively, wherein the device has a reflection-type liquid crystal display area in which: the liquid crystal layer has a phase delay value dΔn of 0.24–0.27 μm; the upper phase film has a function of λ/4 phase compensation and an optical axis of 140° to 146°; the upper orientation film has an orientation angle of 40° to 50° relative to a horizontal line; the lower orientation film has an orientation angle of −10° to −20° relative to a horizontal line; and the upper polarization plate has a transmission axis angle of 104° to 122.5° and a transmission-type liquid crystal display area, positioned between the upper and lower substrates having no reflection electrode, in which: the liquid crystal layer has a phase delay value dΔn of 0.24–0.40 μm; the lower phase film has a function of λ/4 phase compensation and an optical axis of 50° to 64°; and the lower polarization plate has a transmission axis' angle of 100° to 110°.

Preferably, the ratio between the reflection-type liquid crystal display area and the transmission-type liquid crystal display area is 5:5.

Preferably, the phase value of the upper phase film is larger than that of the lower phase film by 5 nm.

Preferably, the interface between the reflection-type liquid crystal display area and the transmission-type liquid crystal display area has a tilt angle of 0 to 80°.

Preferably, the liquid crystal layer is composed of twisted nematic liquid crystals having a twist angle of 60°.

According to another aspect of the present invention, there is provided a semi-transmission type liquid crystal display device comprising:

a lower substrate having a reflection electrode and a lower orientation film;

an upper substrate having a color filter and an upper orientation film;

a liquid crystal layer interposed between the upper and lower substrates;

a lower phase film positioned on the outer surface of the lower substrate for transforming linearly polarized light into circularly polarized light; and upper and lower polarization plates for transforming natural light incident on each of the upper substrate and the lower phase film into linearly polarized light, respectively, wherein the device has a reflection-type liquid crystal display area in which: the liquid crystal layer has a phase delay value dΔn of 0.24–0.27 μm; the upper orientation film has an orientation angle of 40° to 50° relative to a horizontal line; the lower orientation film has an orientation angle of −10° to −20° relative to a horizontal line; and the upper polarization plate has a transmission axis angle of 104° to 122.5° and a transmission-type liquid crystal display area, positioned between the upper and lower substrates having no reflection electrode, in which: the liquid crystal layer has a phase delay value dΔn of 0.24–0.40 μm; the lower phase film has a function of λ/4 phase compensation and an optical axis of 50° to 64°; and the lower polarization plate has a transmission axis angle of 100° to 110° and the upper substrate is a glass substrate having a function of λ/4 phase compensation and exhibiting circularly polarized light at 550 nm.

Preferably, the ratio between the reflection-type liquid crystal display area and the transmission-type liquid crystal display area is 5:5.

Preferably, the lower phase film has a phase value by which λ/4 phase and λ/2 phase films are arranged with an angle and the λ/4 phase and λ/2 phase films are arranged with an optical axis of 85° to 100° and 5° to 20°, respectively.

Preferably, the liquid crystal layer is composed of twisted nematic liquid crystals having a twist angle of 60°.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
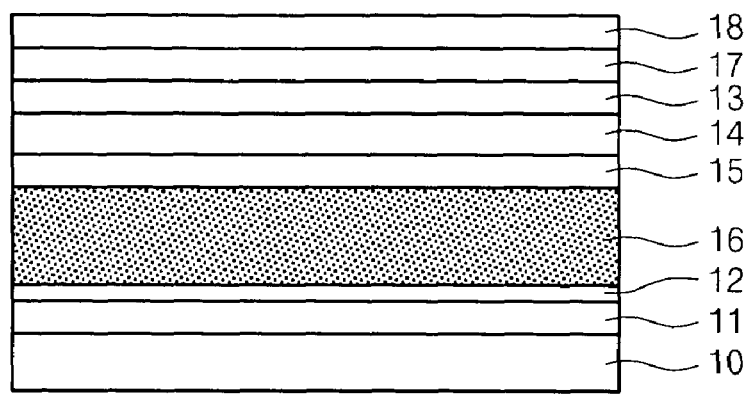
FIG. 1 is a sectional view illustrating a reflection-type liquid crystal display device according to the prior art.

Hereinafter, preferred embodiments of the present invention will be described with reference to the accompanying drawings. In the following description and drawings, the same reference numerals are used to designate the same or similar components, and so repetition of the description on the same or similar components will be omitted.

The present invention attempts to form a semi-transmission type liquid crystal display device by separately designing a reflection-type liquid crystal display area and a transmission-type liquid crystal display area. The device should perform the role of a transmission-type liquid crystal display element while maintaining the function of a reflection-type liquid crystal display element. Accordingly, what is important is the phase delay value dΔn of a liquid crystal layer, as well as the design of a phase film and a polarization plate in the transmission-type liquid crystal display area.

Consequently, the present invention achieves optimal cell configuration for good display screen by utilizing a substrate endowed with a λ/4 function as the upper substrate and optimizing the constitutional elements of the liquid crystal display element, such as the transmission axis angle of the upper polarization plate, the phase delay value of the liquid crystal layer, the rubbing angle which determines the twist angle of the liquid crystal orientation, in accordance with the optical axis of the upper substrate.

Figure 2:
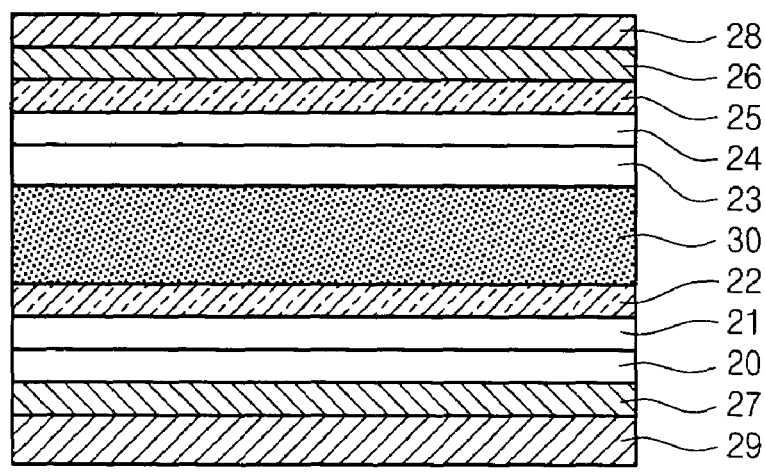
FIGS. 2 and 3 illustrate a semi-transmission type liquid crystal display device according to an embodiment of the present invention.
Figure 3:
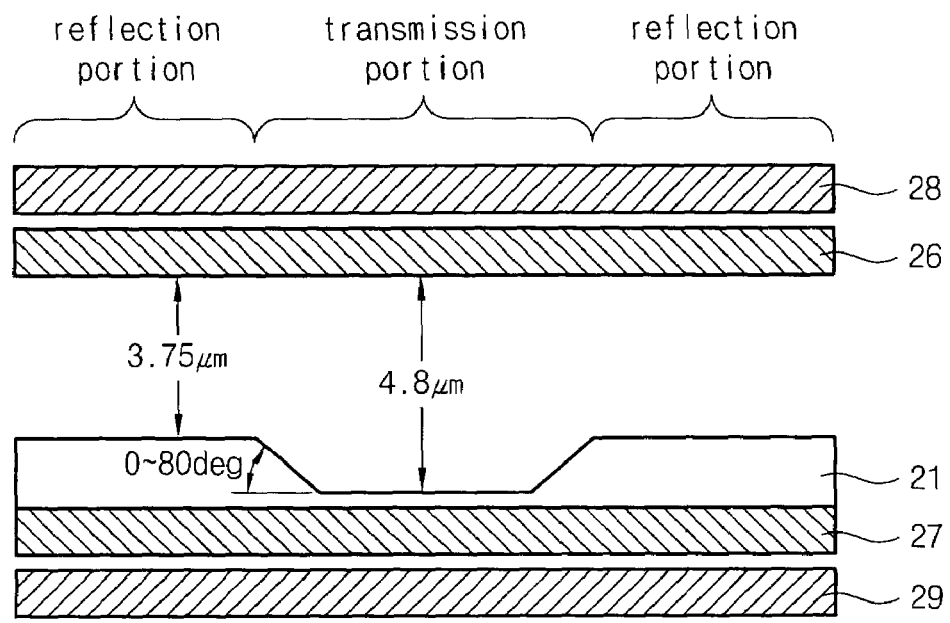

FIGS. 2 and 3 illustrate a semi-transmission type liquid crystal display device according to an embodiment of the present invention. FIG. 3 is a schematic diagram showing the constitution of a liquid crystal cell of the semi-transmission type liquid crystal display device.

Figure 4:
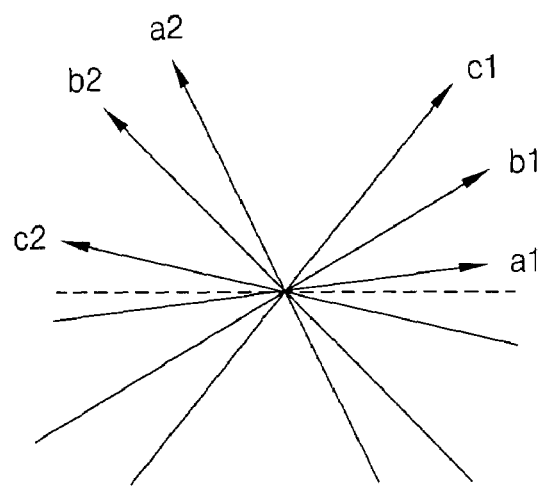
FIG. 4 shows an axial arrangement of each of the components of a semi-transmission type liquid crystal display device according to an embodiment of the present invention.

FIG. 4 shows an axial arrangement of each of the components of a semi-transmission type liquid crystal display device according to an embodiment of the present invention. In the drawing, reference symbols a1, a2 indicate the transmission axes of the lower and upper polarization plates, b1, b2 the optical axes of the lower and upper phase films, and c1, c2 the rubbing axes of the lower and upper substrates, respectively.

A semi-transmission type liquid crystal display device according to an embodiment of the present invention comprises, as shown in FIGS. 2 and 3, a lower substrate 20 having a reflection electrode 21 and a lower orientation film 22, an upper substrate 23 having a color filter 24 and an upper orientation film 25, and a liquid crystal layer 30 interposed between the lower and upper substrates 20, 23. Upper and lower phase films 26, 27 are positioned on the outer surfaces of the upper and lower substrates 23, 20, respectively, for transforming linearly polarized light into circularly polarized light. Upper and lower polarization plates 28, 29 are provided on the upper and lower phase films 26, 27 for transforming natural light from outside into linearly polarized light.

A semi-transmission type liquid crystal display device according to an embodiment of the present invention, as configured above, is divided into a reflection-type liquid crystal display area having a reflection electrode 21 and a transmission-type liquid crystal display area, positioned between the two substrates, having no reflection electrode 21. The ratio between the reflection-type liquid crystal display area and the transmission-type liquid crystal display area remains 5:5. The tilt angle of the interface between the two areas is 0 to 80°.

An optical test was conducted under the following conditions: the upper and lower substrates 23, 20 have a thickness of 1.1 t or less and a refractivity of about 1.53; the transparent electrode of the upper substrate has a thickness of 1500 Å and a refractivity of 1.9; the upper orientation layer has a thickness of 750 Å and a refractivity of 1.6; the thickness of the reflection electrode is set to 1500 Å. Test parameters include the transmission angle of the upper and lower substrates, the phase delay value of the liquid crystal layer, and the orientation angle. The characteristic values of the components for the optimal cell configuration are as follows:

The liquid crystal layer 30 is composed of nematic liquid crystals having a twist angle of 60°. In the reflection-type liquid crystal display area, the liquid crystal layer has a phase delay value $d\Delta n$ of 0.24–0.27 $\mu$m; the upper phase film 28 has a function of $\lambda/4$ phase compensation and an optical axis of 140° to 146°; the upper orientation film 25 has an orientation angle of 40° to 50° relative to a horizontal line; the lower orientation film 22 has an orientation angle of −10° to −20° relative to a horizontal line; and the upper polarization plate 28 has a transmission axis angle of 104° to 122.5°

In the transmission-type liquid crystal display area, having no reflection electrode 21, the liquid crystal layer has a phase delay value $d\Delta n$ of 0.24–0.40 $\mu$m; the lower phase film 27 has a function of $\lambda/4$ phase compensation and an optical axis of 50° to 64°; and the lower polarization plate has a transmission axis angle of 100° to 110°.

The phase value of the upper phase film 26 is larger than that of the lower phase film 27 by 5 nm.

The upper and lower polarization plates 28, 29 are subject to a half-reflection processing or subject to a half-reflection processing and an anti-glare processing at the same time. The upper and lower orientation films 25, 22 are used to orient the liquid crystal molecules effectively. In most cases, they are made of a mixture of polyamic acid and polyimide, considering the affinity with the liquid crystals and the adherence to the substrates.

The upper phase film 26 has a specific phase differential and is made by performing a mono-axial extension of a polymer film selected from polycarbonate, polyolefin, polyvinyl alcohol, and polystyrene.

According to an embodiment of the present invention, in order to obtain the characteristics of a transmission-type liquid crystal display element while maintaining the characteristics of a reflection-type liquid crystal display element, the cell gap is designed to be larger than the reflection-type liquid crystal display area by 1 $\mu$m or so, when designing the reflection-type cell optics. Furthermore, a lower phase film, having a function of mono-axial $\lambda/4$ phase compensation, and a lower polarization plate are adhered to the lower substrate to exhibit optical characteristics. The cell gap differential minimizes the discrepancy in the orientation of the liquid crystals during rubbing, eliminates the disclination line, and therefore provides efficient cell characteristics.

Figure 5:
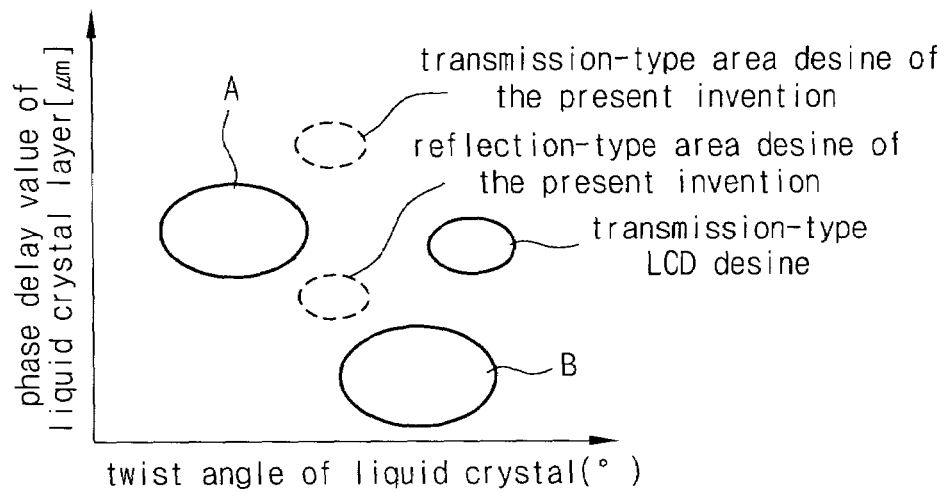
FIG. 5 is a graph illustrating a twist angle and a phase delay value of a semi-transmission type liquid crystal display device according to an embodiment of the present invention.

FIG. 5 is a graph illustrating a twist angle and a phase delay value of a semi-transmission type liquid crystal display device according to an embodiment of the present invention.

As shown in FIG. 5, the device is designed so that the phase delay value of the liquid crystal layer and the twist angle of the liquid crystal are in the ranges of values (shown by dashed lines) corresponding to medium portions of the ranges of values A, B, which are designed for the implementation of good display screen according to the prior art. According, better contrast ratio and color property can be obtained and, particularly, process margin can be improved in relation to the increase of the cell gap, compared with the prior art.

Figure 6:
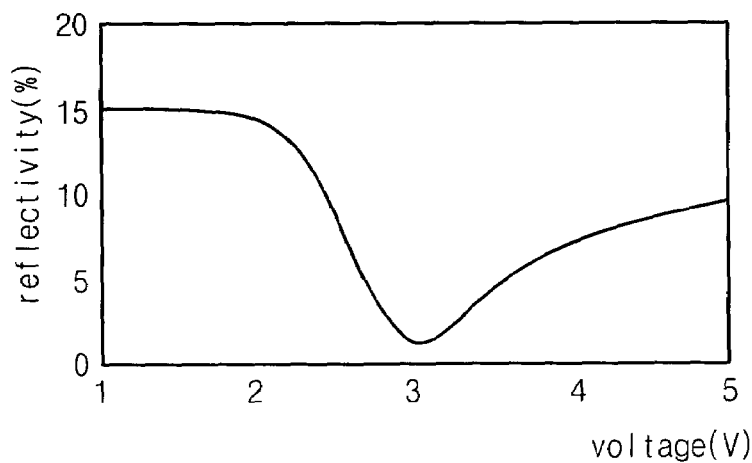
FIGS. 6 to 8 are graphs illustrating the reflectivity characteristics, in relation to a voltage, of a semi-transmission type liquid crystal display device according to an embodiment of the present invention.
Figure 7:
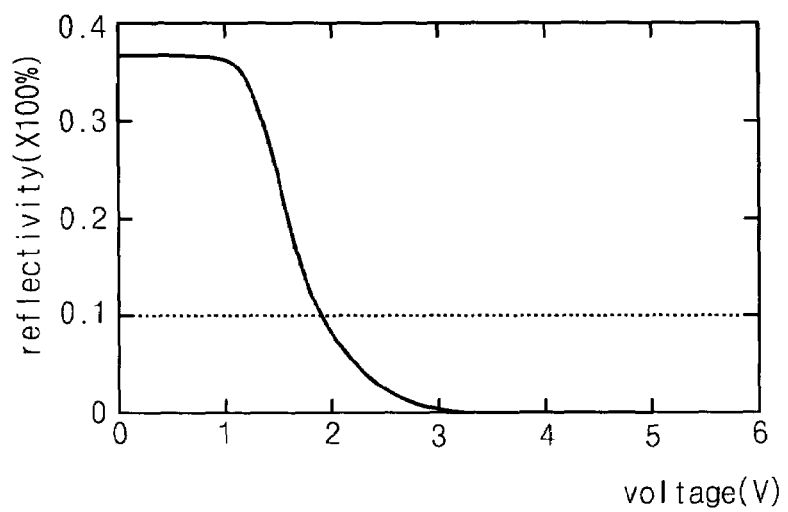
Figure 8:
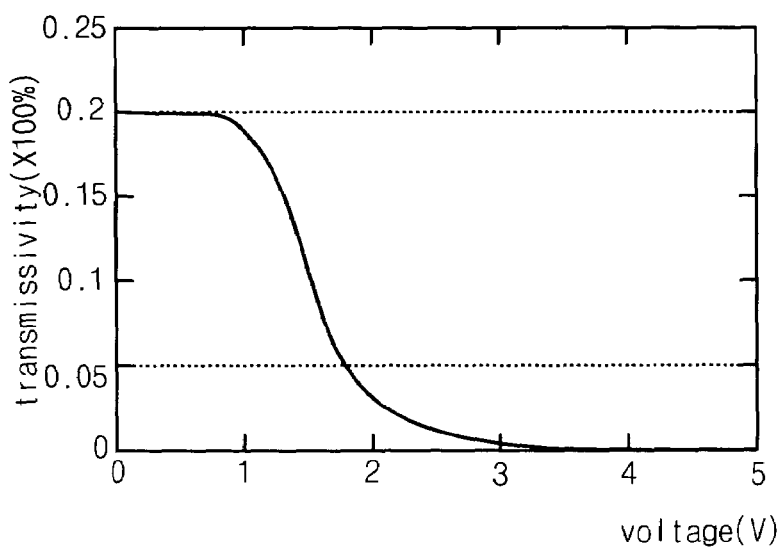

FIGS. 6 to 8 are graphs illustrating reflectivity characteristics, in relation to a voltage, of a semi-transmission type liquid crystal display device according to an embodiment of the present invention. FIG. 6 shows the reflectivity, in relation to a voltage, of a reflection-type liquid crystal display device made by Matsushita Co., Japan. FIGS. 7 and 8 show the reflectivity and transmissivity characteristics, in relation to a voltage, of a liquid crystal cell when the twist angle of the liquid crystal is 60°. More specifically, FIG. 7 shows the reflectivity characteristics, in relation to a voltage, in a reflection mode and FIG. 8 shows the transmissivity characteristics, in relation to a voltage, in a transmission mode.

As shown in FIG. 6, the reflection-type liquid crystal display device made by Matsushita Co. cannot create a perfect dark state when a voltage is applied. In contrast, a semi-transmission type liquid crystal display device according to an embodiment of the present invention can create a dark state when a voltage is applied. This demonstrates that the semi-transmission type liquid crystal display device of the present invention is superior to that of the Matsushita Co. in terms of the reflectivity characteristics in relation to a voltage.

In the case of a semi-transmission type liquid crystal display device according to another embodiment of the present invention, instead of the upper substrate and the upper phase film used in the first embodiment of the present invention, the upper substrate is substituted by a glass substrate having a function of $\lambda/4$ phase compensation and exhibiting circularly polarized light at 550 nm. In addition, the device has a configuration wherein $\lambda/4$ phase films and $\lambda/2$ phase films are arranged at an angle, instead of a lower phase film. The $\lambda/4$ phase and $\lambda/2$ phase films are arranged with an optical axis of 85° to 100° and 5° to 20°, respectively.

The liquid crystal layer is composed of twisted nematic liquid crystals having a twist angle of 60°. In the reflection-type liquid crystal display area, the liquid crystal layer has a phase delay value dΔn of 0.24–0.27 μm; the upper orientation film has an orientation angle of 40° to 50° relative to a horizontal line; the lower orientation film has an orientation angle of –10° to –20° relative to a horizontal line; and the upper polarization plate has a transmission axis angle of 104° to 122.5°

In the transmission-type liquid crystal display area, the liquid crystal layer has a phase delay value dΔn of 0.24–0.40 μm; the lower phase film has a function of λ/4 phase compensation and an optical axis of 50° to 64°; and the lower polarization plate has a transmission axis angle of 100° to 110°.

As mentioned above, the present invention provides a semi-transmission type liquid crystal display device capable of performing the role of a transmission-type liquid crystal display element while maintaining the function of a reflection-type liquid crystal display element. By optimizing the design of the liquid crystal cell in the device, its reflectivity and transmissivity are increased in relation to a voltage. This improves the contrast ratio and the color characteristics and, consequently, provides an excellent display screen.

Furthermore, process margin can be improved by increasing the cell gap, compared with the prior art. This also improves the productivity.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A semi-transmission type liquid crystal display device comprising:
   a lower substrate having a reflection electrode and a lower orientation film;
   an upper substrate having a color filter and an upper orientation film;
   a liquid crystal layer interposed between the upper and lower substrates;
   upper and lower phase films positioned on the outer surfaces of the upper and lower substrates, respectively, for transforming linearly polarized light into circularly polarized light;
   upper and lower polarization plates provided on the upper and lower phase films, respectively, for transforming natural light from outside into linearly polarized light;
   a reflection-type liquid crystal display area; and
   a transmission-type liquid crystal display area located between the upper and lower substrates having no reflection electrode, wherein,
   in the reflection-type liquid crystal display area:
   the liquid crystal layer has a phase delay value (dΔn) of 0.24–0.27 μm;
   the upper phase film has a function of λ/4 phase compensation and an optical axis of 140° to 146°;
   the upper orientation film has an orientation angle of 40° to 50° relative to a horizontal line;
   the lower orientation film has an orientation angle of –10° to –20° relative to a horizontal line; and
   the upper polarization plate has a transmission axis angle of 104° to 122.5°, and, in the transmission-type liquid crystal display area:
   the liquid crystal layer has a phase delay value (dΔn) of 0.24–0.40 μm;
   the lower phase film has a function of λ/4 phase compensation and an optical axis of 50° to 64°; and
   the lower polarization plate has a transmission axis angle of 100° to 110°.

2. The semi-transmission type liquid crystal display device according to claim 1, wherein a ratio between the reflection-type liquid crystal display area and the transmission-type liquid crystal display area is 5:5.

3. The semi-transmission type liquid crystal display device according to claim 1, wherein the upper phase film has a phase value 5 nm larger than that of the lower phase film.

4. The semi-transmission type liquid crystal display device according to claim 1, wherein the upper and lower polarization plates are subject to a half-reflection processing.

5. The semi-transmission type liquid crystal display device according to claim 1, wherein the upper and lower polarization plates are subject to a half-reflection processing and an anti-glare processing.

6. The semi-transmission type liquid crystal display device according to claim 1, wherein the liquid crystal layer is composed of twisted nematic liquid crystals having a twist angle of 60°.

7. A semi-transmission type liquid crystal display device comprising:
   a lower substrate having a reflection electrode and a lower orientation film;
   an upper substrate having a color filter and an upper orientation film;
   a liquid crystal layer interposed between the upper and lower substrates;
   a lower phase film positioned on the outer surface of the lower substrate for transforming linearly polarized light into circularly polarized light;
   upper and lower polarization plates provided on the upper and lower phase films, respectively, for transforming natural light from outside into linearly polarized light;
   a reflection-type liquid crystal display area; and
   a transmission-type liquid crystal display area, positioned between the upper and lower substrates having no reflection electrode, wherein,
   in the reflection-type liquid crystal display area:
   the liquid crystal layer has a phase delay value (dΔn) of 0.24–0.27 μm;
   the upper orientation film has an orientation angle of 40° to 50° relative to a horizontal line;
   the lower orientation film has an orientation angle of –10° to –20° relative to a horizontal line; and
   the upper polarization plate has a transmission axis angle of 104° to 122.5° and
   in the transmission-type liquid crystal display area:
   the liquid crystal layer has a phase delay value (dΔn) of 0.24–0.40 μm;
   the lower phase film has a function of λ/4 phase compensation and an optical axis of 50° to 64°; and
   the lower polarization plate has a transmission axis angle of 100° to 110° and
   the upper substrate is a glass substrate having a function of λ/4 phase compensation and exhibiting circularly polarized light at 550 nm.

8. The semi-transmission type liquid crystal display device according to claim 7, wherein a ratio between the reflection-type liquid crystal display area and the transmission-type liquid crystal display area is 5:5.

9. The semi-transmission type liquid crystal display device according to claim 7, wherein the lower phase film has a phase value by which $\lambda/4$ phase and $\lambda/2$ phase films are arranged with an angle.

10. The semi-transmission type liquid crystal display device according to claim 9, wherein the $\lambda/4$ phase and $\lambda/2$ phase films are arranged with an optical axis of 85° to 100° and 5° to 20°, respectively.

11. The semi-transmission type liquid crystal display device according to claim 7, wherein the liquid crystal layer is composed of twisted nematic liquid crystals having a twist angle of 60°.

* * * * *